US 12,275,603 B2

(12) United States Patent
Vianello et al.

(10) Patent No.: US 12,275,603 B2
(45) Date of Patent: Apr. 15, 2025

(54) DEVICE AND METHOD FOR UNLOADING INSULATING GLASS FROM AN INSULATING GLASS PRODUCTION LINE AND THE SUBSEQUENT CONDITIONING

(71) Applicant: Forel S.P.A. Unipersonale, Roncade (IT)

(72) Inventors: Fortunato Vianello, Roncade (IT); Riccardo Vianello, Roncade (IT)

(73) Assignee: FOREL S.P.A. UNIPERSONALE, Treviso (IT)

( * ) Notice: Subject to any disclaimer, the term of this patent is extended or adjusted under 35 U.S.C. 154(b) by 0 days.

(21) Appl. No.: 18/571,927

(22) PCT Filed: Jun. 15, 2022

(86) PCT No.: PCT/IB2022/055544
§ 371 (c)(1),
(2) Date: Dec. 19, 2023

(87) PCT Pub. No.: WO2022/269413
PCT Pub. Date: Dec. 29, 2022

(65) Prior Publication Data
US 2024/0286853 A1 Aug. 29, 2024

(30) Foreign Application Priority Data
Jun. 22, 2021 (IT) .................. 102021000016373

(51) Int. Cl.
| B65G 49/06 | (2006.01) |
| E06B 3/673 | (2006.01) |
| G01B 5/28 | (2006.01) |

(52) U.S. Cl.
CPC ......... B65G 49/061 (2013.01); B65G 49/067 (2013.01); E06B 3/67373 (2013.01);
(Continued)

(58) Field of Classification Search
CPC .. B65G 47/918; B65G 2249/04; B65G 47/82; B65G 49/068; B65G 49/061;
(Continued)

(56) References Cited

U.S. PATENT DOCUMENTS 3,638,564 A * 2/1972 Prange .................... C03C 17/00
269/119
3,693,321 A * 9/1972 Nilsson ................ B65G 49/069
414/789.5
(Continued)

FOREIGN PATENT DOCUMENTS

| DE | 3728549 A1 * | 5/1988 | ........... B65G 49/068 |
| EP | 1695928 A1 * | 8/2006 | ........... B65G 49/061 |
(Continued)

OTHER PUBLICATIONS

International Search Report for International Patent Application No. PCT/IB2022/055544, mailed Sep. 5, 2022.

*Primary Examiner* — Gregory W Adams
(74) *Attorney, Agent, or Firm* — CANTOR COLBURN LLP

(57) ABSTRACT

A device for unloading insulating glass from a production line has a support frame and a manipulator frame arranged on the support frame and having a manipulator plane provided with a matrix of suction cups adapted to achieve adhesion of the insulating glass to the manipulator plane, and brackets for supporting the insulating glass. Each bracket is movable between a retracted position, where the bracket does not protrude or has minimal protrusion from the manipulator plane, and an extracted position, where the bracket has maximum protrusion from the manipulator plane. A movable abutment moves in a direction substantially parallel to the brackets and interacts with the brackets by a first contact portion of an operating surface to push the brackets towards the retracted position so that the brackets
(Continued)

assume a given protrusion with respect to the manipulator plane between the retracted and extracted positions.

18 Claims, 13 Drawing Sheets

(52) U.S. Cl.
CPC ........ *G01B 5/28* (2013.01); *B65G 2203/0225* (2013.01); *B65G 2203/0233* (2013.01); *B65G 2249/04* (2013.01)

(58) Field of Classification Search
CPC .......... B65G 49/067; B65G 2203/0233; B65G 2203/0225; E06B 3/67373; G01B 5/28
USPC ...................... 294/87.1; 901/31, 39; 414/941
See application file for complete search history.

(56) References Cited

U.S. PATENT DOCUMENTS

| | | | |
|---|---|---|---|
| 3,881,618 A | 5/1975 | Tausheck | |
| 4,559,001 A | 12/1985 | Wiedenhöfer et al. | |
| 4,673,325 A * | 6/1987 | Jago | B65G 49/068 414/798.2 |
| 5,632,595 A * | 5/1997 | Mori | B65G 49/069 414/797 |
| 6,640,458 B2 * | 11/2003 | Sawdon | B25J 15/0052 33/502 |
| 8,256,811 B2 * | 9/2012 | Yeum | B25J 15/0052 269/905 |
| 8,365,386 B2 * | 2/2013 | Vontz | B25J 15/0052 29/466 |
| 9,260,241 B2 * | 2/2016 | Hashimoto | B65G 49/068 |
| 9,643,324 B1 * | 5/2017 | Roy | B25J 9/023 |
| 9,687,985 B2 * | 6/2017 | Ueno | B25J 15/0052 |
| 10,384,298 B2 * | 8/2019 | Kilibarda | B23K 11/314 |
| 10,633,171 B2 | 4/2020 | Mader | |
| 11,027,921 B2 * | 6/2021 | Cole | B25J 15/0052 |
| 2006/0181092 A1 * | 8/2006 | Kikut | B25J 15/0061 294/2 |
| 2016/0376113 A1 | 12/2016 | Mader | |
| 2017/0253439 A1 * | 9/2017 | Kretzschmar | B25J 15/0052 |
| 2018/0029807 A1 * | 2/2018 | Oono | B25J 15/0633 |

FOREIGN PATENT DOCUMENTS

| | | | | |
|---|---|---|---|---|
| EP | 2412658 A1 | | 2/2012 | |
| EP | 3184473 A1 * | | 6/2017 | .......... B65G 49/068 |
| EP | 3680201 A1 | | 7/2020 | |

* cited by examiner

DEVICE AND METHOD FOR UNLOADING INSULATING GLASS FROM AN INSULATING GLASS PRODUCTION LINE AND THE SUBSEQUENT CONDITIONING

CROSS-REFERENCE TO RELATED APPLICATIONS

This application is a National Phase Application of PCT International Application PCT/IB2022/055544, having an International Filing Date of Jun. 15, 2022 which claims priority to Italian Application No. 102021000016373 filed Jun. 22, 2021, each of which is hereby incorporated by reference in its entirety.

FIELD OF APPLICATION

The present invention relates to a device and a method for unloading insulating glass panels from a production line for insulating glass. In particular, the present invention relates to a device and a method referring specifically to insulating glass in which the spacer is made of thermoplastic material.

PRIOR ART

As is well known, production lines for insulating glass are composed of several machines in which the final ones consist of the following automated machines: applicator of the spacer profile to form a spacer frame; coupler, gas charger, press; sealer.

The device and the method of the present invention constitute an innovative solution particularly in the case of a spacer frame made of thermoplastic material that is extruded with a profiled section against one of the glass panes by a nozzle in relative motion with respect thereto.

The extrusion and application of the spacer profile of the insulating glass, particularly to form the spacer frame directly sealed against one or more glass panes constituting the insulating glass, which starts with a thermoplastic product predominantly contained in drums, as will be detailed below, is at present a relevant alternative solution to spacer frames made of rigid inorganic metal material or rigid thermoset organic material or mixed (metal-polymer) rigid or flexible organic material.

The corresponding application is done by displacing the extrados of said thermoplastic profile at an adjustable and controlled distance in reference to the edge of one or more glass panes, or in an absolute position, and has the advantage of simplifying the storage of raw materials, which are limited to drums of product of a single type, black in color, against the numerous types and widths of spacer profiles of the traditional type. The width of the thermoplastic spacer is in fact determined by the position of the shutter of the nozzle outlet mouth, as a function of a predetermined value entered into a programmable control unit.

It is known to carry out the placement of either a rigid spacer frame or a flexible spacer profile pre-coated with primary sealant and/or adhesive on one pane of glass and then for the assembly to be coupled with a second pane of glass and sealed on the entire outer periphery up to the edge of the glass panes to form the so-called insulating glass.

The operation may also be multiple to obtain an insulating glass comprised of three panes of glass and two frames or two spacer profiles, as well as "n" panes of glass and "n−1" frames or spacer profiles.

Recently, the solution has been developed of extruding a thermoplastic product, which is more effective if it is of the reactive type, i.e., one that partially transforms into elastomer by reaction with the humidity of the air, against the face of one or more of the two or more panes of glass so as to form a profile and thus a spacer frame for the subsequent composition of the insulating glass.

The cross section of such an extruded profile is predominantly rectangular, but cross sections having different shapes may also be processed, such as, by way of a non-exhaustive example, those with a slightly convex extrados (orientation referring to the insulating glass chamber).

[d is to this latter type of profile, and thus the corresponding spacer frame, that the device and the method of the present invention turns out to have particular relevance, since the rheology of the chemicals used is rather complex. The complexities stem essentially from their compressibility and non-Newtonian nature. In addition, for finished insulating glass, as it exits the production line, along which, starting from the coupling stage, it has always been supported along the bottom edges of all the glass panes, the following needs arise:

- keeping the insulating glass always supported along the bottom edges of all glass panes; and
- not accumulating insulating glass panes in mutual and progressive support on trestles.

This is because the thermoplastic spacer is subject to the phenomenon of viscous creep, which inexorably occurs as a function of three factors: temperature, stress, and time, even disjunctively and thus, a fortiori, in the combination of more than one.

Moreover, even in the reactive thermoplastic version of the product, these needs are operative, in that the switching of a major part of the thermoplastic product to elastomeric, and thus no longer subject to creep, occurs with sufficient efficacy after a time on the order of weeks.

While the mechanical constraint operated at the perimeter edge by the secondary sealant, which will be discussed below, is important and effective, however its consistency is similar to that of a toothpaste for a time interval of a few hours, on the order of 4-6, and therefore it does not help at all in constraining the viscous creep of the thermoplastic spacer frame, or of the primary sealant, in the case of a rigid spacer frame.

The resulting issues present in the state of the art include:

- the difficulty of unloading the insulating glass from the production line, the manipulation, either by gripping by rows of suction cups acting on the front face, or by matrices of opposing suction cups acting on the top of the insulating glass, being obstructed; in both cases the spacer would be subject to creep predominantly due to applied forces and time;
- the fact that conventional, inexpensive storage trestles may not be used, except for individual units of insulating glass, because, due to the transverse gravity force component with respect to the spacer frame in particular, at a typical 6° inclination of the trestle required for static stability, this component corresponding to 10% of the weight of the unit, the spacer frames of the underlying insulating glass units would be progressively burdened by compressive forces with alteration of the overall thickness of the insulating glass, which is instead required in dimensional tolerance, typically +0.3 mm, i.e., as resulting from leaving the production line.

These issues have been addressed by resorting to compromises such as:

- unloading the insulating glass panels using metal frames equipped with rows of suction cups on the face and support feet on the base, said frames being moved by lifting equipment such as overhead cranes or forklifts, driven by the operator.

not stacking insulating glass panels on trestles or racks, but rather laying them down individually.

The prior art has tried to remedy said drawbacks.

For example, US 2016/0376113A1 concerns a method of unloading from the automatic sealer, with supports placed progressively edges of the glass panes constituting the insulating glass, applicable to all types of spacer frames constituting the insulating glass.

U.S. Pat. No. 10,633,171B2 relates to a storage trestle configuration particularly dedicated to the type of thermoplastic spacer frame constituting the insulating glass, for which the glass panes should not be subjected to force components, either transverse or parallel to the faces of said glass panes, so as not to induce stresses towards the thermoplastic spacer frame.

Such combined technical solutions, however, imply that the insulating glass panels are stored at the warehouse, not in simple trestles, but in a kind of classifier equipped with spacers/separators to be adjusted according to the size of the insulating glass panels.

Moreover, in the case of U.S. Pat. No. 10,633,171B2, the road transport of the trestle may cause instability of the insulating glasses due to the inevitable vibrations.

U.S. Pat. No. 4,559,001 describes the placement on trestles in a vertical arrangement of insulating glass panes side by side and resting on the base, but it does not support said panes below the component glass panes during the transition from the insulating glass manufacturing line to the trestles, and therefore, although it introduces automations that eliminate manual operations, it does not resolve the first of the issues.

Given the subsequent use of insulating glass, i.e., in window frames or curtain walls or structural façades, and with reference to FIG. 1, the insulating glass 1 consists of the composition of two or more panes of glass 2, separated by one or more spacer frames 3, generally made of inorganic material, such as aluminum or stainless steel, or mixed inorganic/organic and organic, being generally, e.g., polyvinyl chloride (PVC), functionally hollow and microperforated on the inward-facing side, the so-called chamber, of the insulating glass, the spacer frames 3 containing in their hollow part hygroscopic material 4 and provided with a butyl sealant 6 on the side faces (forming the so-called first sealant) and the chamber (or chambers, in which case, each chamber), delimited by the glass panes 2 and the spacer frame 3 being able to contain air or gases 8 or mixtures of gases 8 other than air, giving the insulating glass particular properties, for example, thermal insulating and/or sound insulating properties.

Similar compositions are obtained by resorting to a spacer frame in a flexible spacer profile 5 having an essentially rectangular cross section, possibly containing two receptacles on its sides intended for butyl sealant 6, made of synthetic organic material, such as silicone or expanded EPDM (ethylene propylene diene monomer) and bearing in its sides or part thereof an adhesive 6', generally acrylic, useful for both initial and permanent mechanical bonding with the glass panes, or by making use of an extruded spacer profile 7 also having an essentially rectangular cross section made of thermoplastic material, and the latter (but also, to a lesser extent, the former, referred to in the previous paragraph, as will be seen below), is in particular a subject of the present application. In these two configurations 5 and 7, the hygroscopic material 4 is distributed in the mass of said spacer profile since it is already contained in the compound that generates these profiles.

The union between the glass panes 2 and the spacer frame is achieved by means of two levels of sealing: the first (also called "primary" in jargon) 6 having the function of creating hermeticity and initial bonding (however, subject to creep) between these components and concerning the side surfaces of the frame and the portions of the adjacent glass panes (thermoplastic butyl sealant for the shapes of the spacer frames of types 3 and 5, or composed of said spacer frame if of type 7 made of thermoplastic material); the second (also called "secondary" in jargon) 9, typically composed of a two-component, elastomeric sealant, such as polysulfide (PS) or polyurethane (PU) or silicone (SI), processed at room temperature, but also composed of single-component sealant of the type processed at room temperature or the type processed in heat, having the function of achieving ultimate cohesion between the components and mechanical strength of the joint between said components, this joint affecting the space formed of the extrados of the spacer frame 3, 5, 7 and the inner faces of the glass panes 2 up to the edge thereof (see FIG. 1A-1F, all having component 9 in common). This second level of sealing acquires elastic binding capacity between the components: glass panes 2, and spacer frames 3, 5, 7, only when catalysis has taken place between the base and catalyst, in the case of two-component sealants, and between the product and air humidity, in the case of a one-component product. The time required for such catalysis is on the order of hours, typically 4 to 6, a time frame during which the insulating glass panels must not be subjected to stresses that induce creep (creeping) in thermoplastic products, i.e., the primary sealant 6 spread on the side faces of the spacer frame of the rigid type 3 and the integral spacer frame of the thermoplastic type 7.

In the case of a spacer profile 5 made of expanded synthetic material, the first layer of sealant is substituted (in this case failing in the sealing function) or may be supplemented (in this case retaining the sealing function) by an adhesive 6', e.g., acrylic, already spread on the side faces of said spacer profile, and covered with a removable protective film (see FIG. 1D in which this film is already removed). The presence of said adhesive 6' implements the immediate bond between the spacer frame 5 and the glass panes 2 and thus remedies the creep of the primary butyl thermoplastic sealant 6. In said situation, it goes without saying that the ineffectiveness of the secondary sealant 9 is compensated by the bonding function of the adhesive 6', and thus the peripheral joint between the glass panes 2 and the spacer frame 5 is immediately subject to stresses, although not extreme, resulting from improper storage. However, such is a limited exception in quantitative terms.

The glass panes 2 used in the composition of the insulating glass 1 may have different shapes depending on the use of said glass. There are numerous types known to the person skilled in the art, conferring multiple properties to the insulating glass 1 (thermal insulation, soundproofing, anti-intrusion, anti-vandalism, bullet-proofing, accident-proofing, etc., but they are irrelevant to the subject matter of the present invention, except for that the effect that the weight of the glass panes, proportional to the thickness of said panes and any interposed plastic membrane, affects creep.

From the simple summary set forth, it is already evident that a manufacturing line to obtain the insulating glass product 1 requires many cascading processes and in particular comprises the process concerning the formation of the spacer frame of the "extruded thermoplastic" type to which the present application makes a significant functional, aesthetic, and economic ameliorative contribution.

Said processes for the production of the insulating glass 1, each requiring a relative and particular machine to be arranged in series with respect to the other complementary ones, are, by way of non-exhaustive example and at the same time not all necessary, the following (it should be premised that the attitude of the glass panes 2, 2', 2", etc. and insulating glass panels 1, will be further referred to as pseudo-vertical, meaning by this locution that these elements are inclined by a few degrees, typically around 5 to 7, for the purpose of static stability, similarly for the pseudo-horizontal attitude of the transport conveyors acting at the base of the glass panes).

The peripheral face of the glass panes may be subjected to de-beading to remove any coatings in order to allow and maintain the bonding of the primary 6 and secondary 9 sealants and the adhesive 6' over time.

The sharp edges of the glass panes 2 may be subjected to beveling, both to eliminate marginal defects introduced by cutting which the operation, are potentially crack initiators, and to reduce the risk of injury in the subsequent handling of the glass panes 2 and the finished insulating glass 1;

The individual glass panes 2 are subjected to a washing step, with alternating inner glass/intermediate glass, if present/outer glass (the orientation being the one highlighted with sun and heater icons in FIG. 1A-1F)

There is also a step of applying a spacer frame: the previously manufactured spacer frame 3, filled with hygroscopic material 4 and placed on the side faces with thermoplastic (butyl) sealant 6, which has sealing functions against moisture entry and gas leakage 8, in machines outside of the production line of the insulating glass 1, is applied to one of the glass panes 2 forming the insulating glass 1 at a special station of the insulating glass production line 1. Alternatively, a continuous strip of spacer profile 5 is unwound from a reel and applied, upon removal of the protective film, to one of the glass panes 2 until it forms a closed frame, directly constructed in adhesion, provided by the adhesive 6', to one of the glass panes 2, on the same production line as the insulating glass 1. In yet another alternative, and this is particularly the case of the present invention, the spacer profile 7 is directly extruded and shaped with an adequate cross section against the face of one of the glass panes 2 until it forms a closed spacer frame.

There is also a stage of filling with gas, coupling, and pressing of the glass pane assembly with the at least one frame.

There is subsequently a stage where a second sealing of the set of components takes place: glass panes 2, spacer frame 3, 5, 7 at the perimeter. A method which, in the case of all types of spacer frames 3, 5, 7, may be effectively improved by the innovations introduced by the present invention, starting from the stage of unloading the finished insulating glass 1 from the sealer.

Machines and industrial methods are already known for extruding the spacer profile 7 made of thermoplastic material directly against one or more of the glass panes 2; therefore, the aspects related to thermoplasticity, viscous creep (creeping), non-Newtonian behavior of the product, and problems in unloading and storing insulating glass 1, the spacer frame 7 of which is made of thermoplastic material, are given to be known.

SUMMARY OF THE INVENTION

There is therefore a need to solve the drawbacks and limitations mentioned with reference to the prior art.

Therefore, the need is felt to make available a range of devices appropriate to the developments that have recently involved in particular the thermoplastic-type spacer frame.

Moreover, the prior art does not consider that insulating glass, especially when incorporating toughened or laminated glass panes, deviates from the ideal situation of planar geometry, since the tolerances on curvature (e.g., those allowed by ASTM standards) are quite wide.

Also, the prior art t proposes no solution for controlled support on trestles having imprecise geometries.

Moreover, the solutions proposed by the prior art for unloading insulating glass from the production lines, do not consider that insulating glass already arranged on the trestles may have a certain geometric variability that needs to be taken into account in order to support new insulating glass.

Also of relevance to the objects of the invention are the cost-effectiveness of the solution and the rational management of all downstream steps in the production of insulating glass, namely: unloading, storage, rearrangement, transport, and use of the insulating glass panels, up to the return of the trestles containing these panels.

Last but not least, the aspect of accident prevention is definitively addressed and solved by virtue of the solutions adopted in the described devices.

These requirements are met at least partially by a device for unloading insulating glass from a production line for insulating glass, a production line for insulating glass, and a method for unloading insulating glass from an insulating glass production line as described and claimed herein.

DESCRIPTION OF THE DRAWINGS

Further features and advantages of the present invention will be more readily understood from the following description of its preferred and non-limiting examples of embodiments, wherein.

Elements or parts of elements common to the embodiments described hereinafter will be indicated with the same reference numerals.

DETAILED DESCRIPTION

Figure 1:
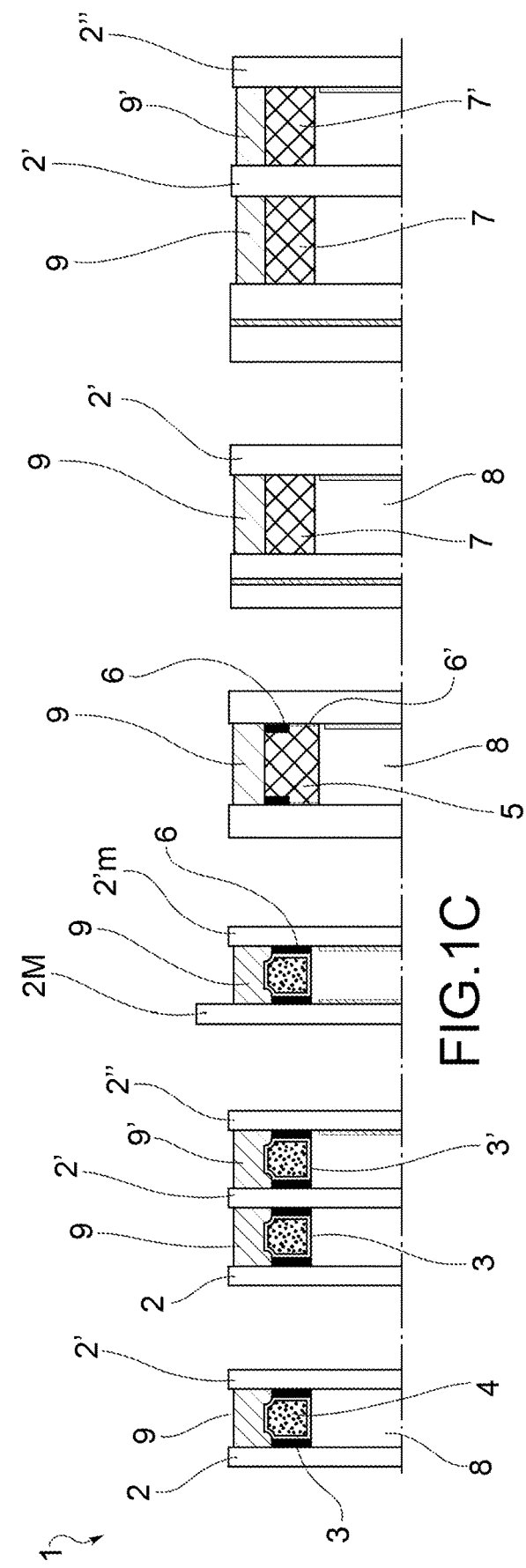
FIG. 1A, 1B, 1C, 1D, 1E, 1F show schematic drawings of the cross sections of insulating glass according to various embodiments.
Figure 2:
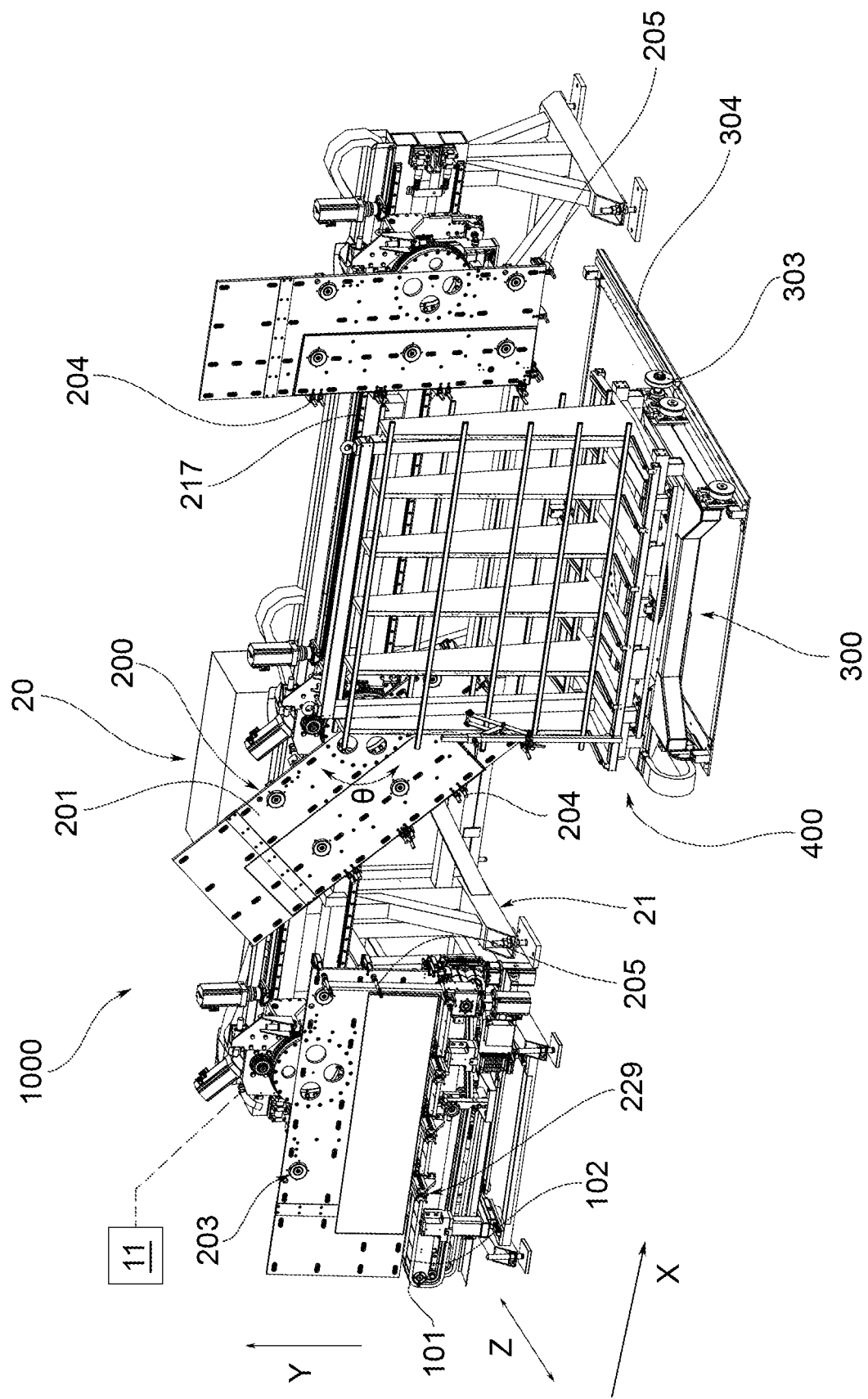
FIG. 2 shows schematically a front view of a portion of a production line for insulating glass, wherein a device for unloading insulating glass is arranged according to an embodiment of the present invention.

FIG. 2 denotes with reference 20 a device for unloading insulating glass 1 from a production line 1000 of said glass.

In this discussion:

X denotes a horizontal direction of translation of insulating glass during its production;

Y denotes a substantially vertical direction of translation of the insulating glass panes, perpendicular to the direction X; this direction is parallel to the plane of attitude of the panes, and thus varies according to the actual manipulation of the panes; at any rate, it is within about +6° of the vertical direction defined by the force of gravity;

z denotes a horizontal direction perpendicular to the direction X;

θ denotes an axis of rotation perpendicular to the plane identified by the axis X and the axis Y;

φ denotes a tilt axis, having a direction parallel to the axis X, and corresponding to an inclination of the plane of attitude with respect to the plane identified by the axis X and the axis Y; and δ denotes a pirouetting axis around a vertical axis.

The device 20 for unloading insulating glass 1 from a production line 1000 comprises a support frame 21 and a manipulator frame 200 arranged on the support frame 21 and adapted for movement in the longitudinal direction with respect to the support frame 21.

The manipulator frame 200 comprises a manipulator plane 201 provided with a matrix of suction cups 203 adapted to achieve the adhesion of the insulating glass 1 to the manipulator plane 201.

The manipulator frame 200, at least at one of its edges 230, 232, comprises brackets 204, 205 adapted to support an insulating glass 1, each bracket 204, 205 being adapted to move in a direction substantially perpendicular to said manipulator plane 201 between a retracted position, in which it does not protrude or has minimal protrusion with respect to the manipulator plane 201, and an extracted position, in which it has maximum protrusion with respect to the manipulator plane 201. Moreover, the device 20 comprises at least one movable abutment 229, 236 adapted to be moved in a direction substantially parallel to the direction of movement of the brackets 204, 205 and adapted to interact with the brackets 204, 205 by means of a first contact portion 234 of an operating surface 233 to push said brackets 204, 205 toward the retracted position so that they assume a specified protrusion with respect to the manipulator plane 201 between the retracted position and the extracted position.

Thus, by moving the movable abutments 229 and 236, it is possible to adjust the protrusion of the brackets 204, 205, which in use support the insulating glass panes, so that said brackets 204, 205 do not protrude from the insulating glass 1.

In other words, the manipulator frame 200, at least at one of its edges 230, 232, comprises at least two brackets 204, 205 adapted for supporting an insulating glass 1. The at least two brackets 204, 205 must be sufficiently spaced apart so that they may stably support the insulating glass pane.

In this discussion. The brackets arranged at the edge 230 will be referred to by the numerical reference 204, while the panes arranged at an edge 232 will be denoted with the numerical reference 205.

Advantageously, the device 20 may comprise a programmable control unit 11 operatively connected to the manipulator frame 200.

According to a possible embodiment, the operating surface 233 may comprise a second contact portion 235, substantially coplanar to said first contact portion 234 and extended at the top to said first contact portion 234 so that under operating conditions, an insulating glass 1 may serve as an abutment for the second contact portion 235 and consequently for said operating surface 233.

In this case, the device is adapted to push the bracket 204, 205 so that it is flush with respect to the insulating glass 1, using said insulating glass 1 as a reference.

According to a possible embodiment, the movable abutment 229 by means of the second contact portion 235 may be used to detect the actual position of a portion of insulating glass 1; the programmable control unit 11 may then be adapted to process this information to determine any flatness error of the insulating glass 1.

In alternative embodiments, the brackets 204, 205 may be pushed certain to a position based on predetermined values of protrusions.

In a further alternative embodiment, the device 20 may comprise detection means (not shown) adapted for detecting the insulating glass. Said detection means may comprise, for example, optical-type devices.

As seen in the appended figures, the brackets 204, 205 may be arranged at two consecutive edges 230, 232 of the manipulator frame. As will be seen below, said solution is particularly advantageous in the case where the manipulator frame 200 may rotate.

According to a possible embodiment, each bracket 204, 205 may comprise a guide 206, 207 and an actuator 208, 209. Advantageously, each actuator 208, 209 may be of the pneumatic type. Said solution appears to be advantageous in that it lends itself to being moved also by the action of an abutment 229, 236 between an extracted position and a retracted position and to maintaining the acquired position. However, according to alternative embodiments, other types of actuators may be used, such that they may be used in a similar way.

According to a possible embodiment, the manipulator frame 200 and consequently the brackets 204, 205, are adapted to be moved according to a direction Y. In a possible alternative embodiment, the brackets 204, 205 are arranged with their own movement means with respect to the manipulator plane 201.

Figure 5:
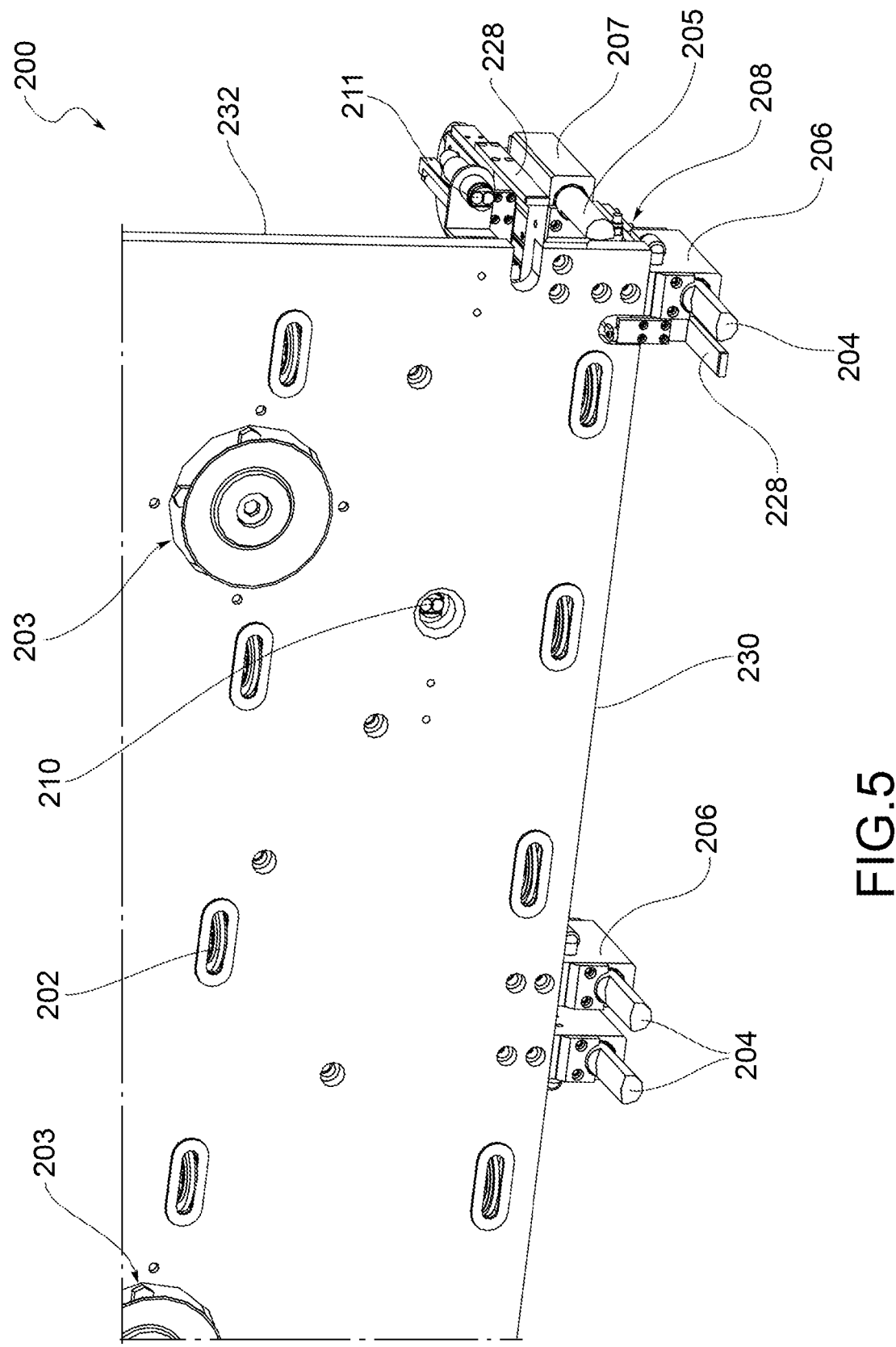
FIG. 5 shows schematically a portion of a device for unloading insulating glass according to an embodiment of the present invention.
Figure 6:
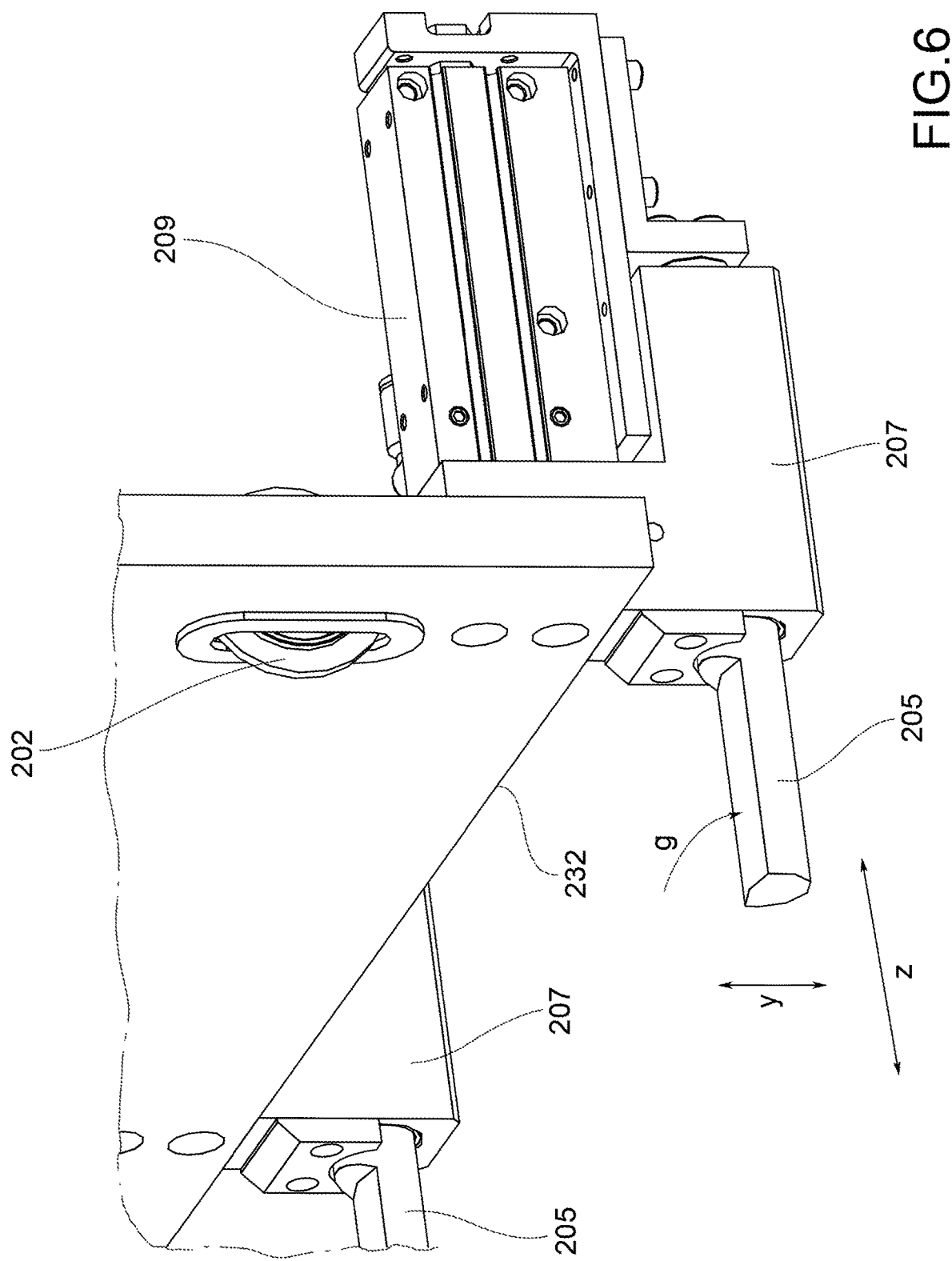
FIG. 6 shows schematically a component of a device for unloading insulating glass according to an embodiment of the present invention.
Figure 7:
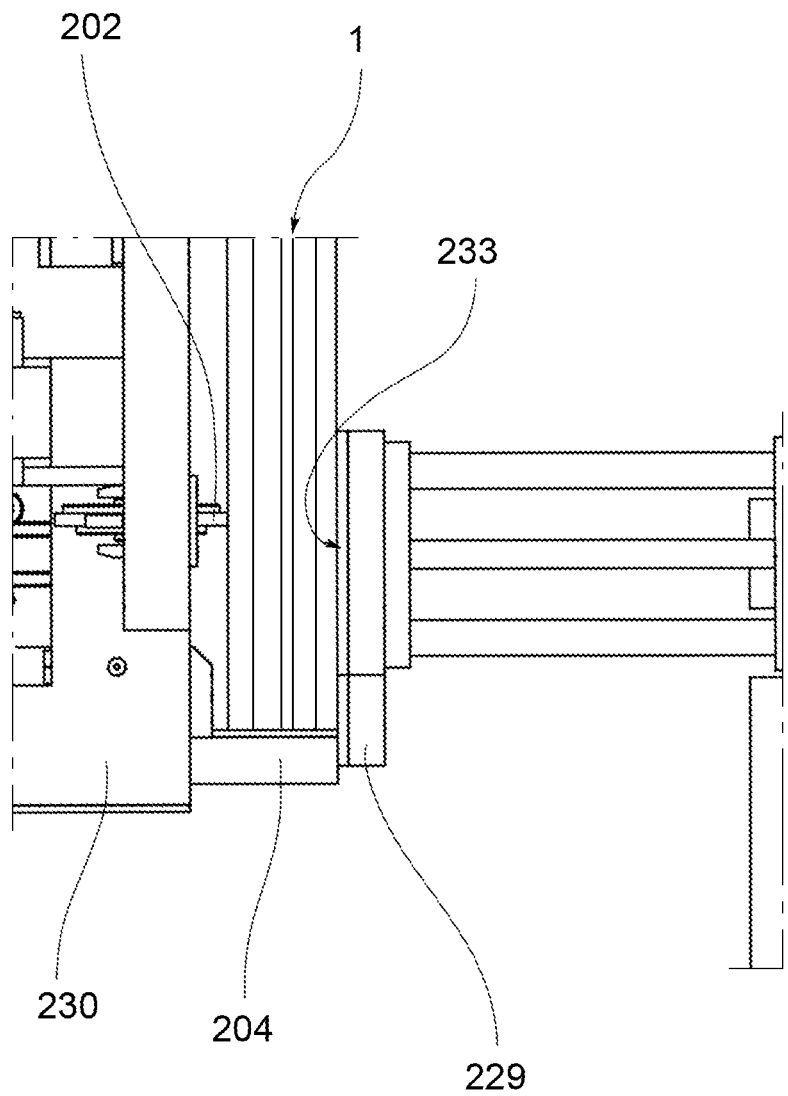
FIG. 7 shows schematically a side view of a portion of a device for unloading insulating glass according to an embodiment of the present invention in a particular stage of operation.

As shown in FIG. 5, the brackets 204, 205 may be adapted to be moved along the axes y and z, which may be substantially parallel to the axes Y and Z mentioned above.

The movement of the brackets 204, 205 along the axes y and z may be performed in a manner known per se, through movement means (not shown in the appended figures).

As seen in the example in FIG. 2, 5 the brackets 204 placed on the edge 230 may also be arranged close together, for example, in pairs. An embodiment of this type is shown for example in FIG. 5.

Figure 3:
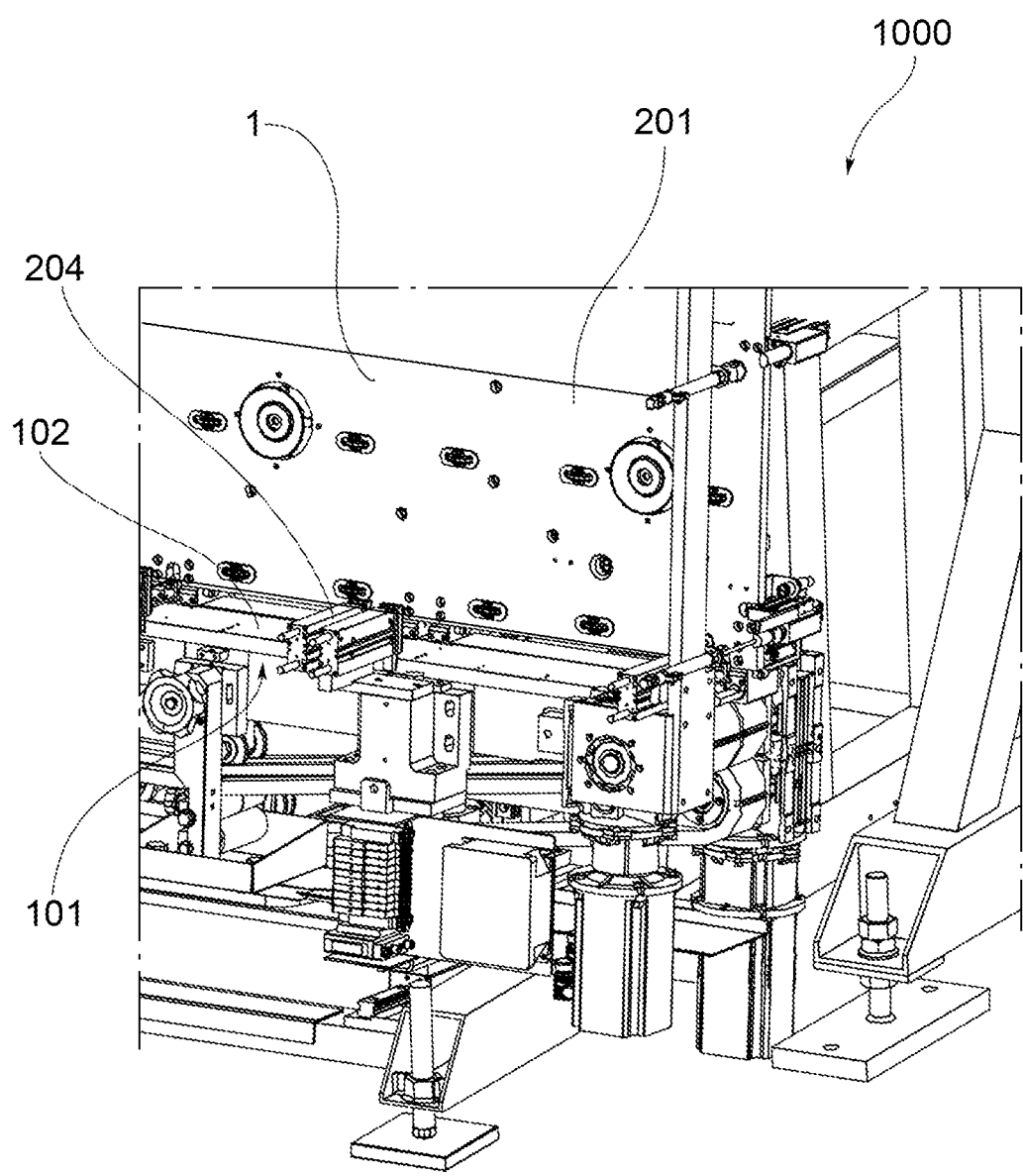
FIG. 3 shows schematically an enlarged portion of a device according to an embodiment of the present invention, in a particular condition of use.

As may be seen in the example in FIG. 3, the insulating glass panel 1, as produced in the production line for insulating glass 1000, is stationed on an outfeed conveyor 101, set up with support elements 102 that are operable in step and in phase so that, in one of the options, the lower support brackets 204 of the manipulator frame 200 may at the appropriate time penetrate between the support elements 102.

With brackets 204 arranged also close together, e.g., in pairs, it is not necessary for the support elements 102 of the outfeed conveyor 101 to be actuated in step and in phase with said brackets 204, since at least one of the brackets of the pair may exit, according to the axis z, into the gap between contiguous support elements 102, while the possibly interfering bracket remains in the retracted position due to the mechanisms described below. The lifting of the insulating glass panel 1 is actuated by the synchronous axis Y with which the manipulator frame 200 may be equipped, as the support brackets 204 simply have to lift the insulating glass panel 1 from the conveyor 101 and, at the end of the movement cycle, arrange it on planes of a collection trestle 400. According a possible alternative embodiment, each bracket 204 may instead be arranged with its own actuator to move the bracket along the axis y.

According to a possible embodiment, the movable abutment 229, 236 may comprise a pneumatic or electric actuator for moving the operating surface 233.

The movable abutment 229, 236 may comprise a potentiometer 231 operatively connected to a programmable control unit 11 adapted to detect the resistance to advancement of the operating surface 233. The programmable control unit may be adapted to interrupt the advancement and retracting of said operating surface upon reaching a determined value detected by the potentiometer.

According to a possible embodiment, the manipulator plane 201 of the manipulator frame 200 may comprise idle rollers or alternatively an air cushion.

Further features of the device 20 according to the present invention will be presented in connection with specific uses of the device in a production line for insulating glass 1.

In its essential embodiment, the method for unloading insulating glass 1 from a production line 1000 with a device 20 for unloading insulating glass comprises the following steps:

placing the insulating glass on the elements 102 of the conveyor 101;

actuating the brackets 204, 205 in exit (extracted position);

activating the movable abutments 229 and 236 adapted for movement in a direction (z) substantially parallel to the brackets 204, 205, and pushing the brackets 204, 205 by means of a first contact portion 234 of an operating surface 233 toward the retracted position so that they assume a specified protrusion with respect to the manipulator plane 201 between the retracted position and the extracted position.

lifting the manipulator plane 201 according to the axis Y and thus also the insulating glass 1 supported by the brackets 204;

activating the suction cup matrix 203 to achieve the adhesion of the insulating glass 1 to the manipulator plane 201.

Advantageously, when activating the movable abutment, an insulating glass placed on the conveyor 101 may act as an abutment for the second contact portion 235 and consequently for the operating surface 233.

According to an embodiment, the method may comprise a step of mapping the flatness of an insulating glass 1 based on the position assumed by the brackets 204, 205 retracted as a result of the action of the movable abutments 229 and 236.

The method may then include a step of moving the manipulator frame 200 to arrange the glass pane on a trestle 400. The movement phase may comprise translations along an axis (X), an axis (Y), and/or even a rotation around an axis θ substantially perpendicular to the plane defined by the axis X and the axis Y, and around the tilting axis φ, having a direction substantially parallel to the axis X.

In a possible mode of operation, the manipulator frame 200, in its start-of-cycle condition is in a position such that it forms, with its manipulator plane 201, which has a pseudo-vertical attitude equipped with idle rollers 202 or alternatively an air cushion, overlying the pseudo-horizontal outfeed conveyor 101, an extension and continuity of the pseudo-vertical bearing plane of the production line for insulating glass 1. In this case, the tilting with respect to the axis φ will have the same value adopted in the production line for the insulating glass.

In this standby phase, the lower support brackets 204, which may be actuated according to their axes z and y (the actuation with respect to the axis y may be performed by dedicated means, or by the movement means of the manipulator frame 200), are set back and slightly lowered with respect to the upper plane of the support elements 102 of the conveyor 101. As the insulating glass panel 1 is available in the final zone of the conveyor 101 following translation of the support elements 102, which may, for example, be displaced on a closed drive chain, actuated by said conveyor, and due to the support on the rollers 202 or the air blowing of the plane 201, mechanisms of the manipulator frame 200 actuate the displacements, pseudo-horizontal according to the axis z, and subsequent retraction caused by the abutments 229 and pseudo-vertical according to the axis y or Y of the support brackets 204, and in succession the activation of the matrix of suction cups 203 interfaced with the insulating glass panel 1 occurs to keep it constrained to the manipulator.

After this stage the manipulator 200, due to its actuated axes: X, Y (in the alternative that will be seen below, optional to y), θ, φ, (or y optional to Y), z, and to the presence of the additional brackets 205, provided with displacements according to the axis z, may be in a condition to perform any movement of the insulating glass panel 1, always in a situation of keeping it supported at the edges of the insulating glass panel 1 toward the action of gravity, as well as in a constrained condition due to the active function of the rows of suction cups 203. In particular, the manipulator may perform the operation of picking up the insulating glass panel 1 by intersecting with the final conveyor of the production line for insulating glass, as hitherto described.

In a simple and preferred combination, among the possible options, the manipulator 200, as depicted in the various figures, is equipped with an axis Y (synchronous or actuated) that eliminates the axes y of the brackets 204.

The mechanisms for controlling the stroke of the brackets 204, arranged in a pair according to the axis z, are composed of the guides 206 and the pneumatic actuators 208, these actuators being controllable with limited pressure so that the bracket of the pair of brackets that interferes with the support 102 of the conveyor 101, stopping against this support and thus preventing its pneumatic actuator from sending the end-of-stroke signal to the controller, receives the command to implement the return stroke, while the pneumatic actuator of the complementary bracket of the pair may cause it to advance by inserting itself into the gap between the supports 102. One refinement may be that of the two brackets 204, the one that reaches its own end-of-stroke, because it corresponds to the gap between the supports 102, is controlled by an open-center solenoid valve so as to ensure its combination with the lower edges of the glass panes and the stability.

Figure 4:
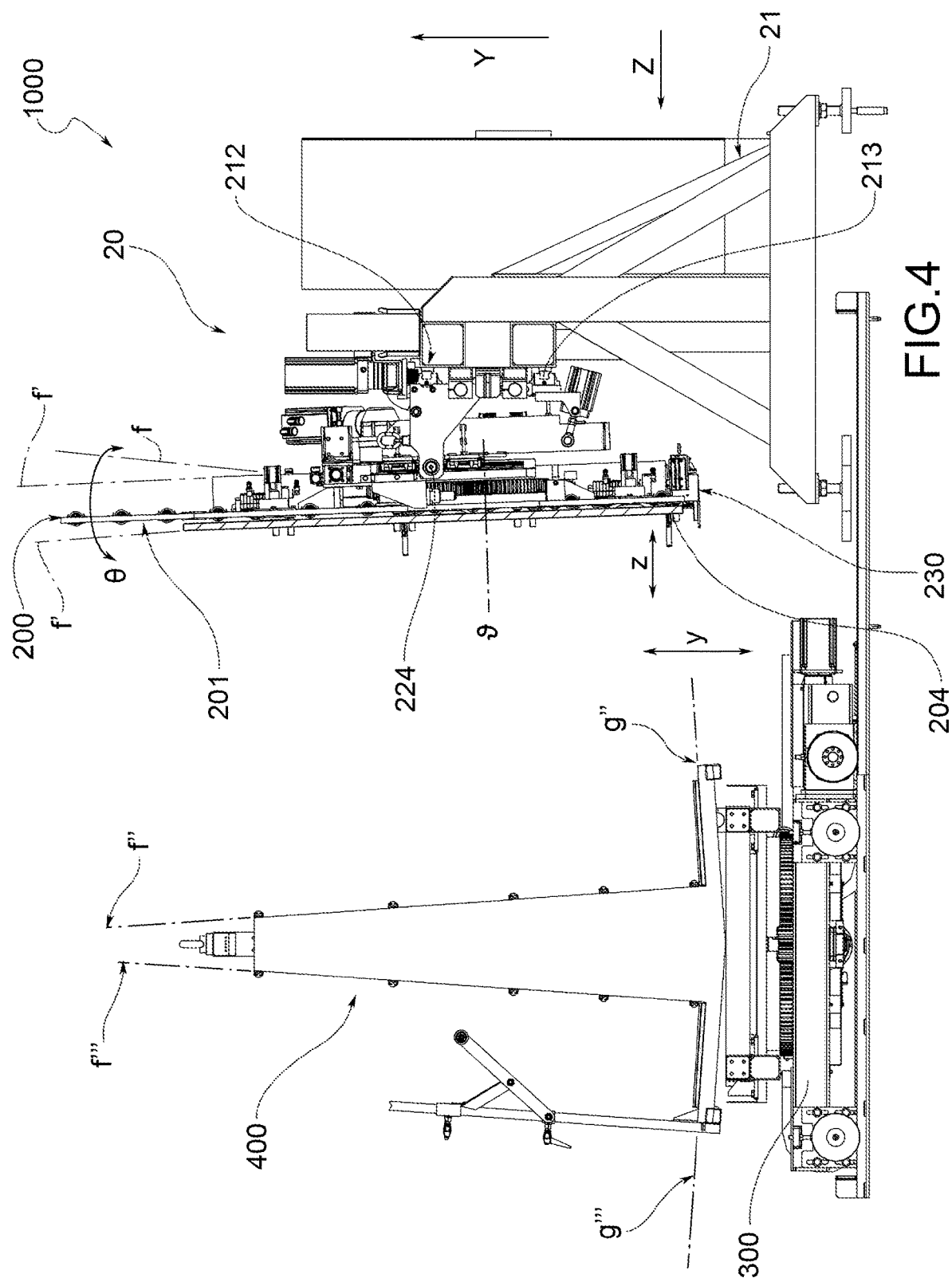
FIG. 4 shows schematically a side view of a portion of a production line for insulating glass, wherein a device for unloading insulating glass is arranged according to an embodiment of the present invention.

The brackets 205 do not need this logic because the insulating glass panel has already rested against it in the phase of ejection from the production line for insulating glass 1 and placement on the conveyor 101, by action of, for example, slowing 210 and stop 211 sensors, as shown in the example in FIG. 4.

The possible movements that may be actuated with the device 20 according to the present invention will be described below, describing relevant possible embodiments.

Figure 8:
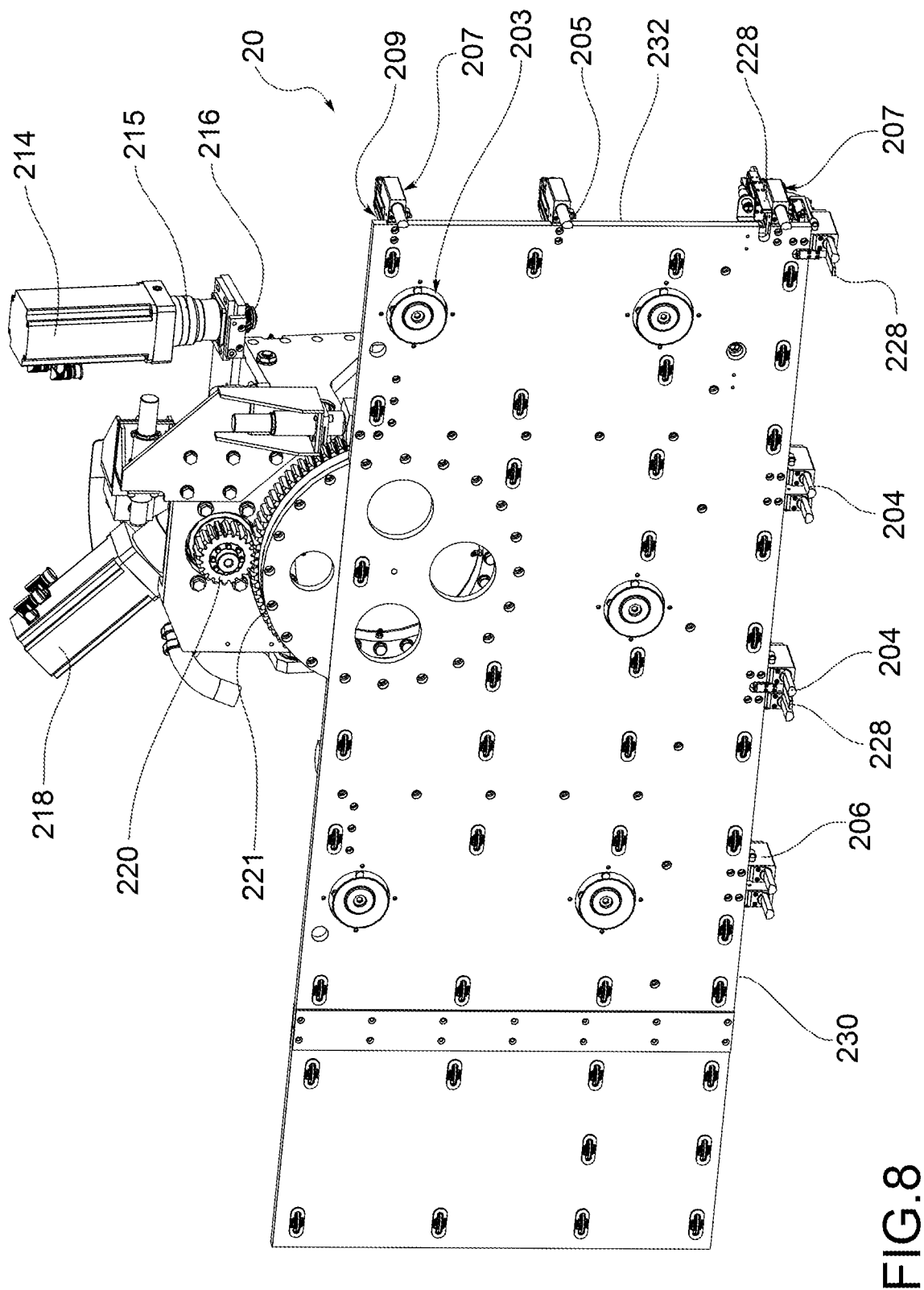
FIG. 8 shows schematically a perspective view of a device for unloading insulating glass according to an embodiment of the present invention.
Figure 9:
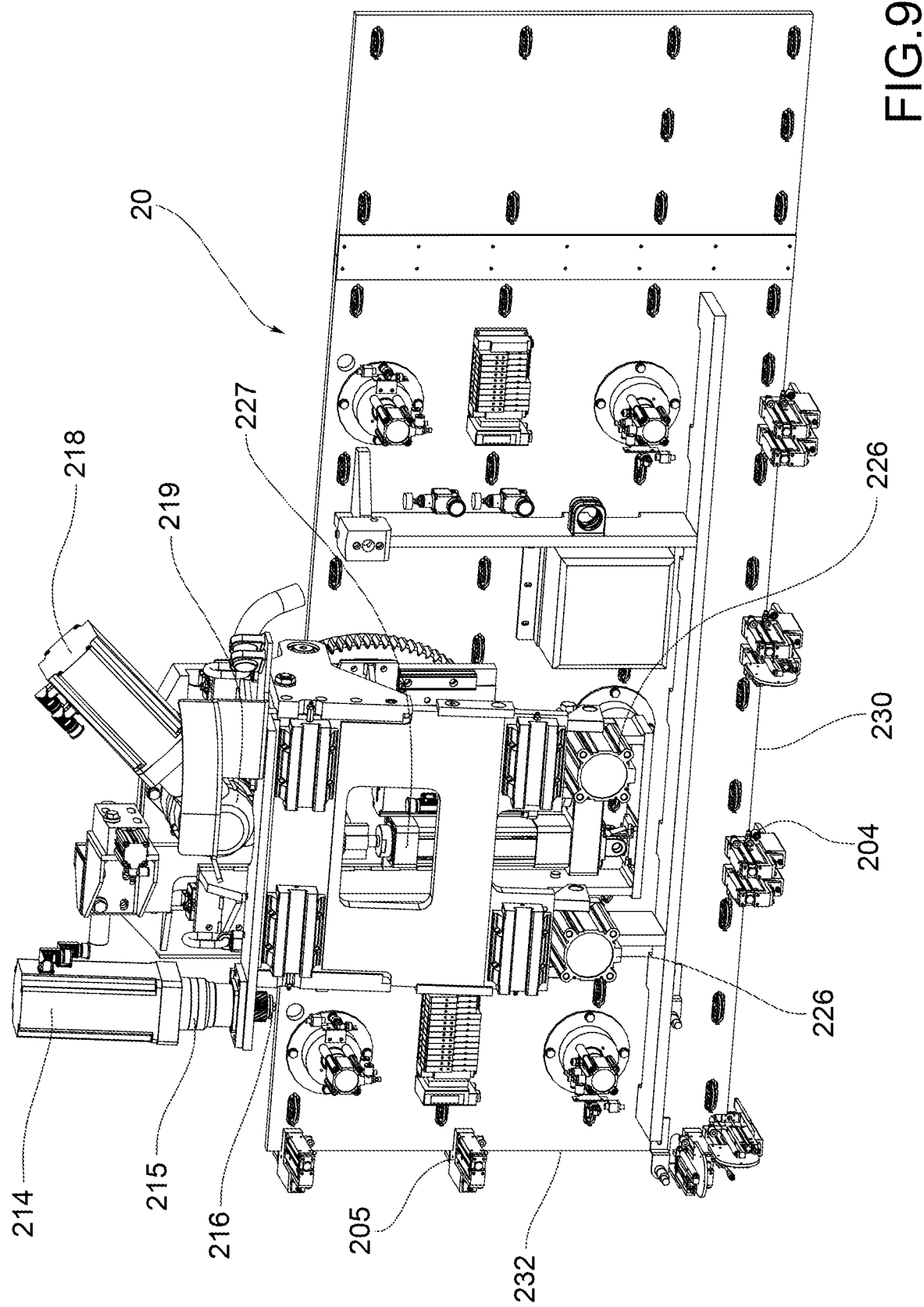
FIG. 9 shows schematically a perspective view from behind of a device for unloading insulating glass according to an embodiment of the present invention.
Figure 10:
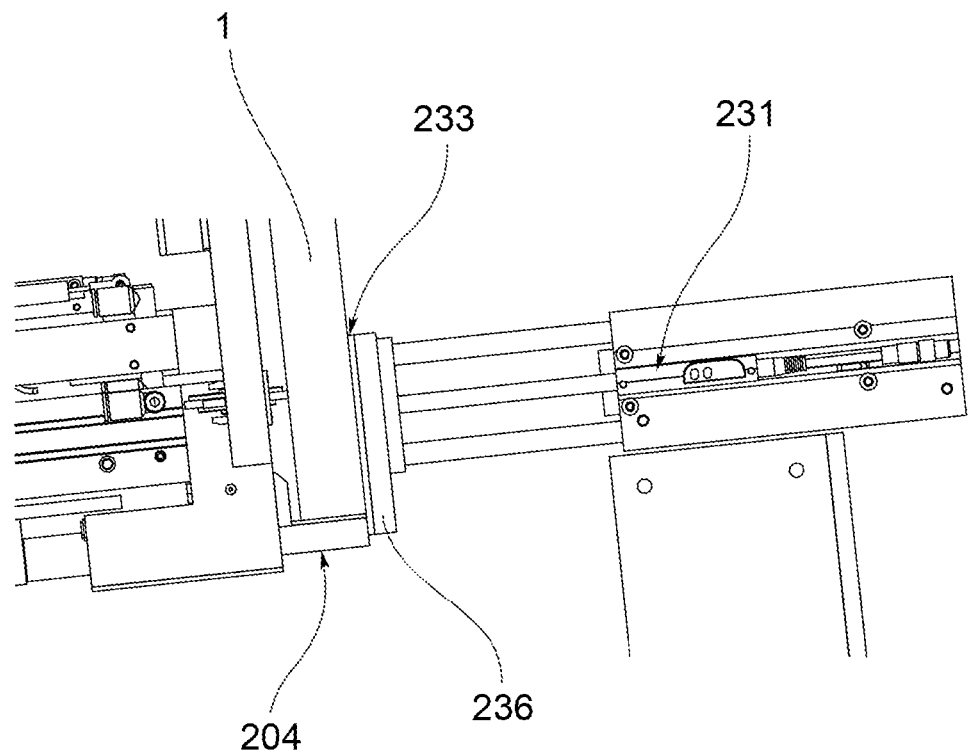
FIGS. 10 and 11 show schematically a portion of a device for unloading insulating glass according to an embodiment of the present invention in particular stages of operation.
Figure 11:
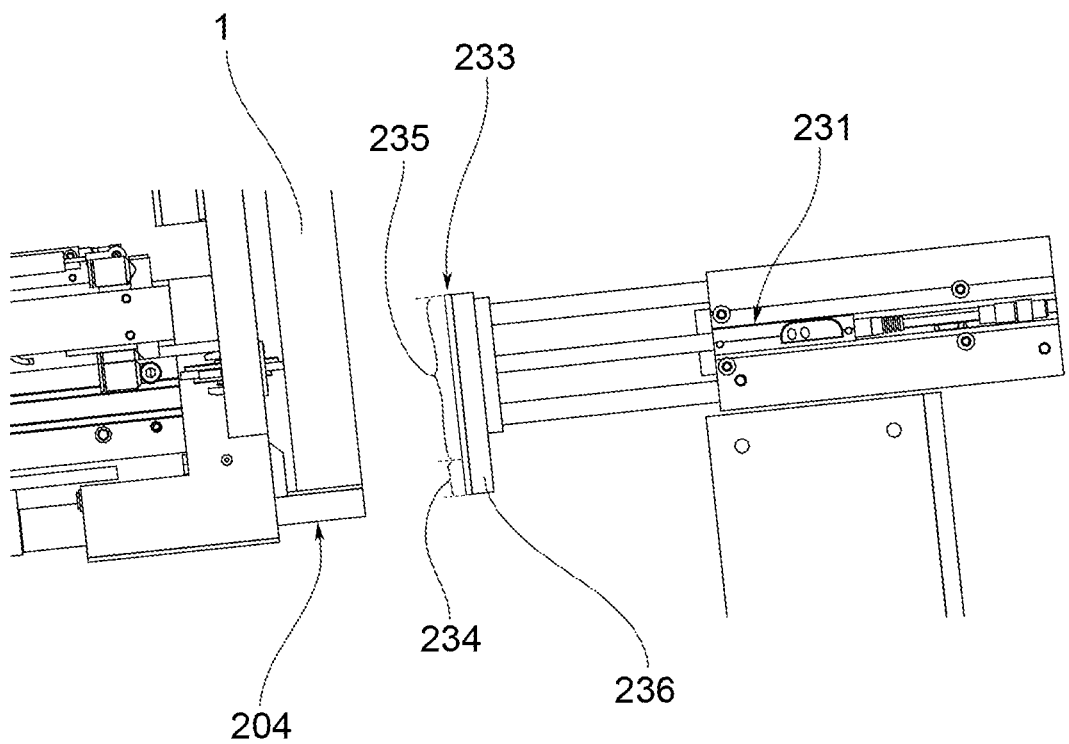

As shown in FIG. 8, the manipulator frame 200 that may be moved along the axis X through a synchronous actuator 214 is also actuated along the axis Y by a synchronous actuator 227.

The device 20 may comprise, for example, a first translation according to X, with sliding of the manipulator frame 200 along guides 212 by means of ball circulation skids 213, which may be actuated by means of a synchronous motor 214, gearbox 215, pinion 216, and rack 217, for the possible placement of the insulating glass panel 1 in the quality control station and any touch-ups on the perimeter sealing.

In addition, the device 20 may comprise a second translation at the unloading station and possibly with a start of rotation according to 9 superimposed. The rotation according to 9 may be implemented, for example, by a synchronous motor 218, gearbox 219, pinion 220, and gear wheel 221 to give a different orientation to the insulating glass panel 1. For example, the rotation according to 9 may be completed up to 90° in a third step.

Finally, the device 20 may comprise an interfacing movement with a trestle 400.

Advantageously, the device 20 may allow the insulating glass panel 1 to be presented with the horizontal attitude of either the long side or the short side in order to compact the nesting of panels to increase the capacity of the trestle 400. In fact, it is possible to achieve on the whole rather simple mechanisms for stacking insulating glass panels 1 with the faces mutually adjacent.

The following is the succession of steps and the operation of the mechanisms involved relative to said fourth movement of the insulating glass panel 1. It is described in the option of combining the intervention of the axes X, Y, Q, Z.

Once the insulating glass panel 1 is in the unloading station, in the desired orientation (long side horizontal or short side horizontal), its attitude is changed, through actuators 226 causing the tilting according to φ, from the attitude f, coplanar with the sliding planes of the production line of the insulating glass 1 and the manipulator plane 200, e.g., inclined by about 6 positive degrees with respect to the vertical plane (the positive being understood to provide for the stability of the panel), to a new attitude f' equal to 1 or 2 negative degrees of the manipulator plane 201 parallel to the subsequent attitude f" of the support plane of the trestle 400.

According to a possible embodiment, the inclination of the support plane f" of the trestle 400 may be about 1 or 2 positive degrees. In this way, stacking on the trestle does not cause compression toward the spacer frame between the loaded insulating glass panels 1.

The negative tilt mentioned in paragraph is borne by the action of the suction cup matrix 203 of the manipulator plane 201 as long as the insulating glass panel 1 is stationed in that plane (see FIGS. 2 and 4) and is transformed to positive when, at the same attitude, although maintained at 1 or 2 degrees, it is considered stable because it is resting on the trestle 400 on the face of the insulating glass panel 1 opposite to that on which it was resting in both the production line and in the manipulator frame 200 before tilting according to φ; and in any case such a transformation at an angle limited to 1 to 2 degrees may take place without the presence of the operator.

Said switching of attitude may take place by tilting according to the axis φ on the fulcrum 224 actuated for example by pneumatic actuators 226, the adjustments of the angles of the opposite end stops being obtained by means of screws equipped with lock nuts (not shown).

In this condition, the steering module 300 bearing, in the constrained condition, the trestle 400, translating according to the axis Z, approaches or moves away if the trestle 400 has already received the insulating glass panels 1, the manipulator 200, the base of the trestle, to interface with the base of the insulating glass panels 1 having the attitude g''' just below the corresponding top position g' of the brackets 204 (or 205 if the insulating glass 1 is arranged with the short side horizontal), these attitudes being orthogonal to those f''' and f' relative to the corresponding faces of the insulating glass panel 1.

Figure 12:
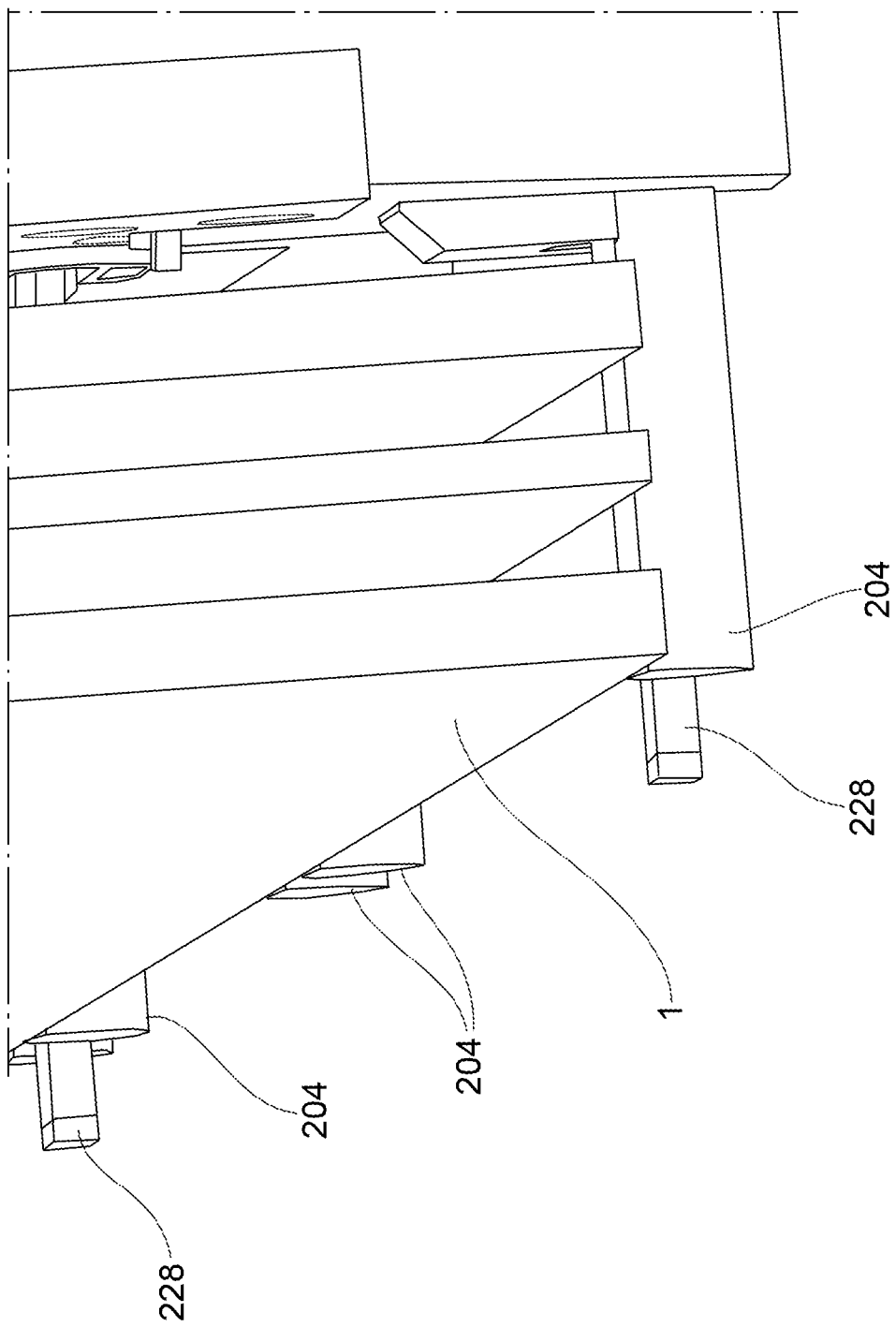
FIG. 12 shows schematically a portion of a device for unloading insulating glass according to an embodiment of the present invention.

According to a possible embodiment, said approaching/distancing may be performed by means of a synchronous motor that through a gearbox acts on a pinion 303 coupled with a rack 304. The extent of the displacement may be managed by a control unit 11, the input data of which may be derived from the management system in which the geometric dimensions and processing sequence of all the insulating glass panels 1 reside, together with the cooperation of touch probes/sensors shown in FIGS. 5, 8 and 12 with 228.

According to a possible embodiment, the touch probe 228 may comprise a pneumatic actuator and a potentiometer, adapted to detect the number of strokes made by said touch probes 228.

The steering module 300 may also be provided with rotational motion 8 about the vertical passing through the center of gravity of the same, upon moving away from the manipulator 200 operated by a synchronous motor in order to present its face f''' mirrored to f' opposite the manipulator 200, to complete the loading. Said motion may be obtained through an actuator and known gearbox-, pinion-, and spur-type kinematics.

The present invention may have variant embodiments (with respect to that which may be inferred from the drawings, the details of which are clear and illustrative), all of which fall within the scope of equivalence with the inventive concept, such as for example: the mechanical solutions for the motions of the manipulator frame; the drive means, which may be electric, electric-electronic, pneumatic, hydraulic and/or combined, etc.; the control means, which may be electronic or fluidic and/or combined, etc.

A variant of the hitherto described part of the invention, albeit a secondary one, and obtained by acting only on the software prepared on the programmable control unit 11 and thus using the same devices described previously for the rectangular-shaped glass panes 2 hitherto described, is comprised of the logical combination of synchronous or nonsynchronous actuators relative to the axes: X, Y, (y alternative to Y), z, θ, φ, Z, δ, so as to allow the manipulation of insulating glass panels having a shape other than rectangular.

The materials and dimensions may be any depending on the requirements deriving in particular from the dimensions (base, height, thicknesses) and/or shape of the glass panes 2, 2', 2", 2''', 2M, 2'm, 2"m, etc., that will make up the insulating glass 1 once the spacer profile 7 has been extruded to form the spacer frame and a second pane has been coupled and possibly additional spacer frames and glass panes have been coupled.

The advantages that may be achieved with the device and the method according to the present invention are thus apparent.

First, a method has been provided that allows for insulating glass to be arranged safely after its production on a trestle, without the brackets 204, 205 being able to bump against the insulating glass arranged previously on the trestle.

In addition, a device has been provided that may also be used to map and manage the non-flatness of an insulating glass unit by using the movable abutments 229 and 236 toward the brackets 204 and 205.

Also, with the embodiment that provides for at least part of the brackets to be double, it is possible to prevent the movement of incoming supports from the production line from being synchronized with the positions of the brackets themselves during the unloading phase.

Those skilled in the art will be able to make modifications to the embodiments described above or substitute described elements with equivalent elements, in order to satisfy particular requirements, without departing from the scope of the accompanying claims.

Figure 13:
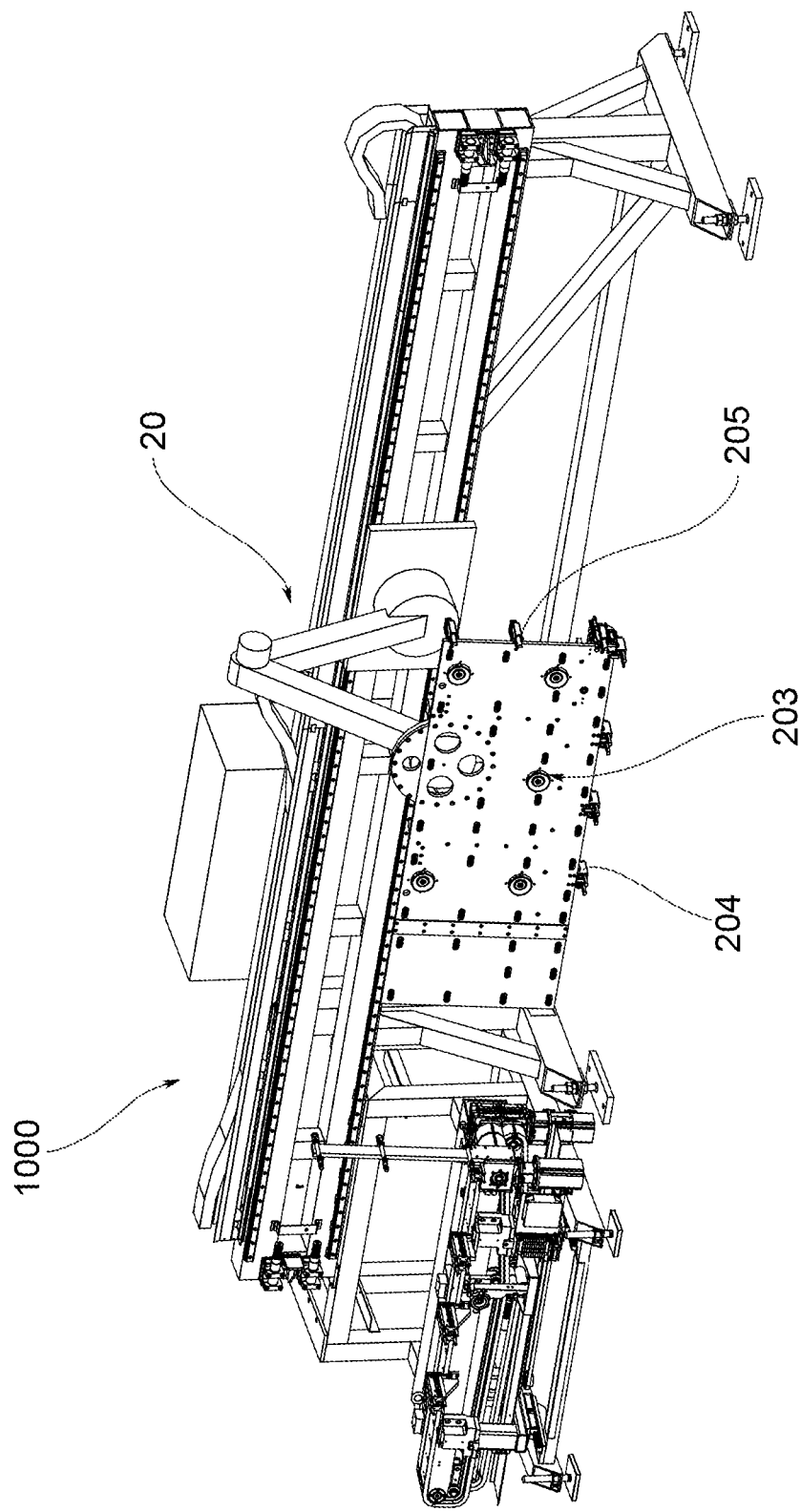
FIG. 13 shows schematically a perspective view of a device for unloading insulating glass according to an embodiment of the present invention.
Figure 14:
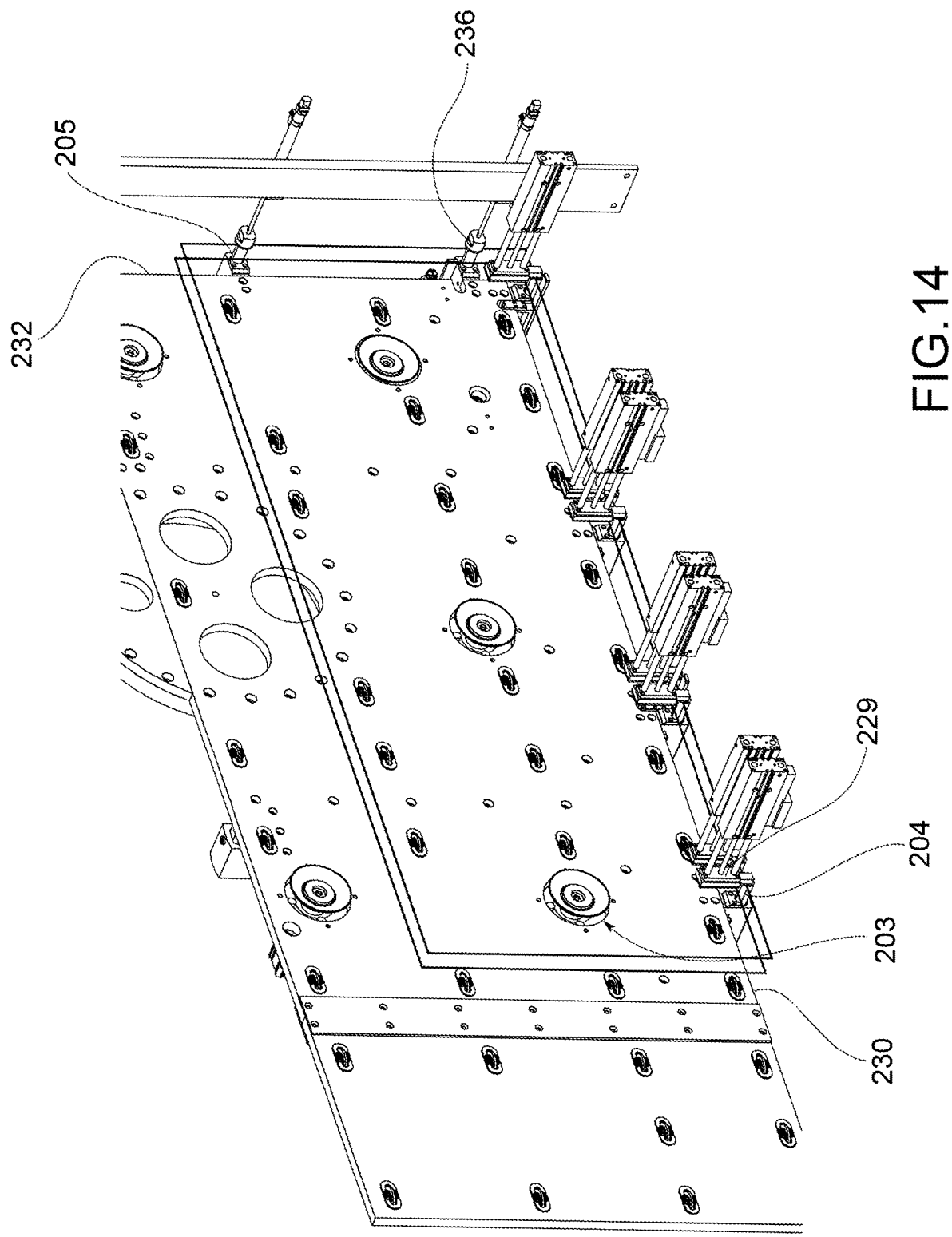
FIG. 14 shows schematically a view from the front of an alternative embodiment of a device according to the present invention.

For example, an alternative embodiment of the device 20 is shown in FIG. 13, wherein the movement of the manipulator frame 200 is implemented by means of an anthropomorphic arm.

The invention claimed is:

1. A device for unloading insulating glass from a production line, the device comprising a support frame and a manipulator frame arranged on said support frame and adapted to be moved in a longitudinal direction with respect to said support frame, said manipulator frame comprising a manipulator plane provided with a matrix of suction cups adapted for achieving adhesion of the insulating glass to said manipulator plane,
    wherein said manipulator frame, at least at an edge thereof comprises brackets adapted for supporting an insulating glass, each said bracket being adapted to be moved in a substantially perpendicular direction with respect to said manipulator plane between a retracted position in which the brackets does not protrude or has minimal protrusion with respect to said manipulator plane and an extracted position in which the brackets has maximum protrusion with respect to said manipulator plane; and
    wherein the device further comprises at least one movable abutment adapted for being moved in a direction substantially parallel to said brackets and suitable for interacting with said brackets by a first contact portion of an operating surface to push said brackets towards the retracted position so that the brackets assume a given projection with respect to the manipulator plane between the retracted position and the extracted position.

2. The device of claim 1, further comprising a programmable control unit operatively connected to said manipulator frame.

3. The device of claim 2, wherein said operating surface comprises a second contact portion substantially coplanar with respect to said first contact portion, and extending above with respect to said first contact portion, so that under operating conditions, an insulating glass pane acts as an abutment for said second contact portion and consequently for said operating surface.

4. The device of claim 3, wherein said at least one movable abutment by said second contact portion may be used to detect an actual position of a portion of the insulating glass; the programmable control unit being adapted to process information on the actual position to deal with possible planarity errors of the insulating glass.

5. The device of claim 1, wherein the manipulator frame at two consecutive edges comprises brackets adapted for supporting the insulating glass.

6. The device of claim 1, wherein each bracket comprises a guide and a pneumatic actuator.

7. The device of claim 1, wherein said manipulator frame and said brackets are suitable to be moved according to a substantially vertical direction.

8. The device of claim 1, wherein said at least one movable abutment comprises a pneumatic or electrical device for moving said operating surface.

9. The device of claim 8, wherein said at least one movable abutment comprises a potentiometer operatively connected to a programmable control unit adapted for detecting a resistance to an advancement of the operating surface, said programmable control unit being adapted for interrupting the advancement and retracting said operating surface upon reaching a stop condition detected by the potentiometer.

10. The device of claim 1, further comprising at least one touch probe near an edge of the manipulator frame, suitable for detecting a position of an insulating glass pane on a trestle.

11. The device of claim 10, comprising at least one touch probe on two consecutive edges of the manipulator frame, suitable for detecting the position of the insulating glass pane on the trestle.

12. A production line for insulating glass, comprising the device of claim 1.

13. A method for unloading insulating glass from a production line with a device for unloading insulating glass from the production line, the device comprising
    a support frame and a manipulator frame arranged on said support frame and adapted to be moved in a longitudinal direction with respect to said support frame, said manipulator frame comprising a manipulator plane provided with a matrix of suction cups adapted for achieving adhesion of the insulating glass to said manipulator plane,
    wherein said manipulator frame, at least at an edge thereof comprises brackets adapted for supporting an insulating glass, each bracket being adapted to be moved in a substantially perpendicular direction with respect to said manipulator plane between a retracted position in which the bracket does not protrude or has minimal protrusion with respect to said manipulator plane and an extracted position in which the bracket has maximum protrusion with respect to said manipulator plane;
    wherein the device further comprises at least one movable abutment adapted for being moved in a direction substantially parallel to said brackets and suitable for interacting with said brackets by a first contact portion of an operating surface to push said brackets towards the retracted position so that the brackets assume a given projection with respect to the manipulator plane between the retracted position and the extracted position, and wherein said operating surface comprises a second contact portion substantially coplanar with respect to said first contact portion, and extending above with respect to said first contact portion, so that under operating conditions, an insulating glass pane acts as an abutment for said second contact portion and consequently for said operating surface, the method comprising:

placing an insulating glass on said brackets;

moving each bracket between the retracted position and the extracted position;

activating the at least one movable abutment; and lifting said brackets along an axis (Y, y), in contact with said insulating glass.

14. The method of claim 13, wherein, in said step of activating the at least one movable abutment, an insulating glass pane positioned at the brackets acts as an abutment for said second contact portion and consequently for said operating surface.

15. The method of claim 14, further comprising mapping a planarity of the insulating glass pane based on a position assumed by the at least one movable abutment.

16. The method of claim 15, wherein after placing the insulating glass on said brackets, and lifting the brackets along the axis (Y, y), the matrix of suction cups is activated to achieve the adhesion of the insulating glass pane to said manipulator plane; said method further comprising a handling step of said manipulator frame to deposit said insulating glass pane on a trestle; said handling step comprising translations along an X-axis, a Y-axis, and/or a Z-axis, a possible rotation about a θ-axis substantially perpendicular to a plane identified by the X-axis and the Y-axis, and a rotation about a φ-axis, having a direction substantially parallel to the X-axis, lowering of the manipulator frame along the Y-axis and, with respect to the trestle, translation along the Z-axis and possible rotation around a δ-axis.

17. The method of claim 16, wherein geometry of the insulating glass pane deposited on the trestle, or of a face f" or f" of the trestle, is verified by touch probes arranged at the at least one edge of the manipulator frame to properly stop the trestle in a stroke of a steering unit according to the Z-axis and to adopt a suitable inclination of a face f' through tilting along the q-axis.

18. The method of claim 17, wherein, concurrently with a stroke along the Y-axis for depositing an edge on a plane g" or g" after pirouetting along the 8-axis, a vacuum degree of the matrix of suction cups is reduced for a soft coupling of the insulating glass pane on the trestle.

\* \* \* \* \*